United States Patent
Hall

(10) Patent No.: US 10,018,521 B2
(45) Date of Patent: Jul. 10, 2018

(54) SOLID-STATE SHEAR-STRESS SENSOR

(71) Applicant: SILICON AUDIO, INC., Austin, TX (US)

(72) Inventor: Neal A. Hall, Austin, TX (US)

(73) Assignee: Silicon Audio, Inc., Austin, TX (US)

( * ) Notice: Subject to any disclaimer, the term of this patent is extended or adjusted under 35 U.S.C. 154(b) by 63 days.

(21) Appl. No.: 15/211,554

(22) Filed: Jul. 15, 2016

(65) Prior Publication Data

US 2017/0016785 A1 Jan. 19, 2017

Related U.S. Application Data

(60) Provisional application No. 62/193,175, filed on Jul. 16, 2015.

(51) Int. Cl.
G01L 1/14 (2006.01)
G01L 1/16 (2006.01)

(52) U.S. Cl.
CPC ..................................... *G01L 1/16* (2013.01)

(58) Field of Classification Search
CPC ... G01L 1/16; G01H 5/00; H04R 1/08; H04R 17/02
USPC ...................................................... 73/862.625
See application file for complete search history.

(56) References Cited

U.S. PATENT DOCUMENTS

| | | | |
|---|---|---|---|
| 4,951,510 A | 8/1990 | Holm-Kennedy et al. | |
| 5,052,228 A | 10/1991 | Haritonidis | |
| 6,809,516 B1 | 10/2004 | Li et al. | |
| 7,942,072 B2 * | 5/2011 | Chang | G01L 5/162 73/862.041 |
| 8,250,926 B2 * | 8/2012 | Yang | G01L 1/142 73/715 |
| 8,421,311 B2 * | 4/2013 | Chuang | G01L 1/16 310/328 |
| 8,943,897 B2 * | 2/2015 | Beauvais | A61B 5/1038 73/774 |
| 9,136,459 B2 * | 9/2015 | Fujii | H01L 41/04 |
| 9,222,846 B2 * | 12/2015 | Lim | G01L 1/142 |
| 9,229,592 B2 * | 1/2016 | Bulea | G06F 3/044 |
| 9,347,838 B2 * | 5/2016 | Chen | G01L 1/142 |
| 2003/0164048 A1 | 9/2003 | Shkel | |
| 2017/0016783 A1 | 1/2017 | Hall et al. | |

* cited by examiner

*Primary Examiner* — Harshad R Patel
*Assistant Examiner* — Octavia Hollington
(74) *Attorney, Agent, or Firm* — Meyertons Hood Kivlin Kowert & Goetzel, P.C.; Jeffrey C. Hood; Brian E. Moore

(57) ABSTRACT

A sensor systems including solid-state shear-stress sensors are presented. A solid-state shear-stress sensor system may include a substrate, a first layer of sensing material disposed on a first surface of the substrate, and at least two electrodes forming an electrode pair. The at least two electrodes may include a first electrode and a second electrode. The first electrode may be disposed in a first plane and the second electrode may be disposed in a second plane. The first and second planes may be associated with a first direction and may be substantially parallel to one another and the first surface. The first and second electrodes may be at least partially offset in the first direction. The sensor system may be configured to generate an output signal in response to a shear stress within the sensing material.

20 Claims, 1 Drawing Sheet

SOLID-STATE SHEAR-STRESS SENSOR

PRIORITY DATA

This application claims benefit of priority to U.S. Provisional Application Ser. No. 62/193,175, titled "Solid-State Pressure Sensors", filed Jul. 16, 2015, by Neal A. Hall, which is hereby incorporated by reference in its entirety as though fully and completely set forth herein.

FIELD OF THE INVENTION

This disclosure relates generally to sensors and more particularly to solid state shear-stress sensors for use in, for example, experimental diagnostic tools.

DESCRIPTION OF THE RELATED ART

Pressure (or more generally, stress) sensors, which may be used in a variety of applications (e.g., military and/or commercial aircraft (including subsonic and hypersonic vehicles), military and/or commercial boating, research and development, commercial products, biomechanics, etc.), generally include a means of measuring a pressure or stress acting on a surface. Such sensors may measure normal stress (acting orthogonal to the surface) and/or shear stress (acting parallel to the surface). Such stresses may result from flow applications (that is, applications involving the flow of a fluid across the surface) and/or from touch applications (that is, applications involving a solid object in direct contact with the surface).

Some applications (e.g., applications involving the complex flows encountered in ground and flight tests related to hypersonic vehicles) require reliable experimental diagnostic tools, including pressure sensors. Such applications may involve flows that include any combination of flows that are three dimensional, unsteady, or transitional and may further involve flows over rough surfaces, combustion (e.g., chemical reactions that may release energy in the form of heat and/or light) or shock waves. Historically, only indirect methods (such as heat flux measurements) have been used to measure shear stress in applications with high-speed or complex flows.

What is needed is a shear stress sensor that is ready and easy to use, reliable, temporally and spatially resolved as required by the user, and/or capable of withstanding high temperatures (e.g., up to 1200K).

Further applications similarly require improvements in existing stress sensor technology. For example, stress sensors may be used in touch sensing applications, including for a "smart skin" that may envelop a robotic or prosthetic hand or for development of an algorithm for controlling grip. Such applications may require a variety of stress sensing technologies, including a sensor or a sensor package that can detect both normal and shear stress.

Further improvements in the field are desired.

SUMMARY OF THE INVENTION

Various embodiments of solid-state shear-stress sensors are presented herein. In some embodiments, a sensor system may include a substrate, a first layer of sensing material disposed on a first surface of the substrate, and at least two electrodes forming an electrode pair. The at least two electrodes may include a first electrode and a second electrode. The first electrode may be disposed in a first plane and the second electrode may be disposed in a second plane. The first and second planes may be associated with a first direction substantially parallel to the first surface, e.g., the first and second planes may be substantially parallel to one another. The first and second electrodes may be at least partially offset in the first direction. For example, the first direction may be defined as a horizontal direction and the first and second electrodes may be offset both horizontally and vertically. As another example, a second direction may be defined as orthogonal to the first direction and the first and second electrodes may be offset in both the first and second directions. The sensor system may be configured to generate an output signal in response to a shear stress within the sensing material.

In some embodiments, the sensor system may be configured to sense force and/or stress in response to a force applied to the sensor system and the output signal may be generated in response to the force applied to the sensor system. In some embodiments, the sensor system may be configured to sense a shear force and/or a shear stress (e.g., a force or stress substantially parallel to the sensor system) in response to a force applied to the sensor system. The force applied to the sensor system may be a force vector, wherein the force vector may comprise a first force component orthogonal to the sensor system and a second force component parallel to the sensor system. The shear force and/or shear-stress sensor may be responsive to the second force component. A direct current (DC) bias voltage may be applied between or across the at least two electrodes during operation. A polarization may be induced between or across the at least two electrodes, wherein the polarization induces a first polarization vector. The first polarization vector may point substantially between the at least two electrodes. The first polarization vector may have a direction substantially parallel to a plane defined by the at least two electrodes. The first layer of sensing material may be a ferroelectric material. At least one of the at least two electrodes may be disposed on a surface of the sensing material, on a surface of the substrate, or within the first layer of the sensing material. In some embodiments, the substrate may be silicon or sapphire.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The following detailed description makes reference to the accompanying drawings, which are now briefly described.

Figure 1A:
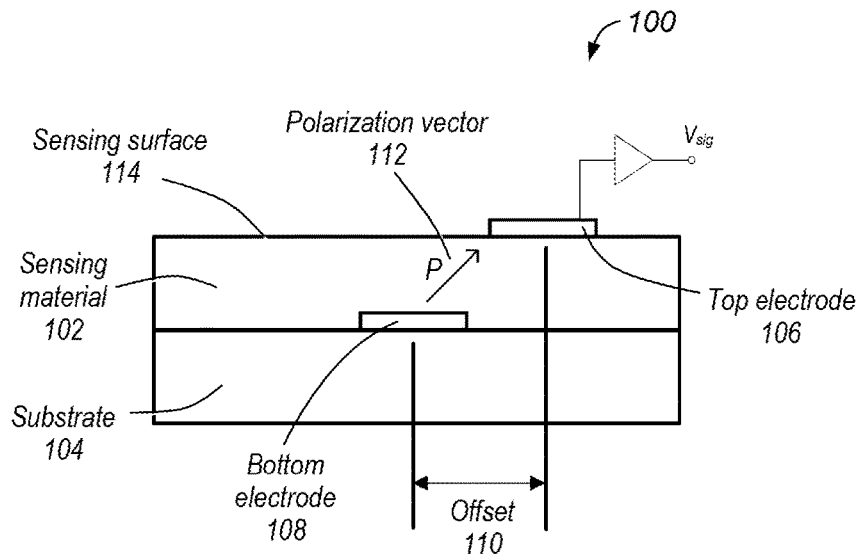
FIGS. 1A-1B illustrate a single electrode pair sensing cell according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF THE INVENTION

Terms

Approximately/Substantially—refers to a value that is almost correct or exact. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application. Furthermore, the term approximately may be used interchangeable with the term substantially. In other words, the terms approximately and substantially are used synonymously to refer to a value, or shape, that is almost correct or exact.

Couple—refers to the combining of two or more elements or parts. The term "couple" is intended to denote the linking of part A to part B, however, the term "couple" does not exclude the use of intervening parts between part A and part B to achieve the coupling of part A to part B. For example, the phrase "part A may be coupled to part B" means that part A and part B may be linked indirectly, e.g., via part C. Thus part A may be connected to part C and part C may be connected to part B to achieve the coupling of part A to part B.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Processing Element (or Functional Unit)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Piezoelectric Structure—refers to at least one layer of piezoelectric material with at least one electrode disposed on the at least one layer of piezoelectric material.

Trans-impedance amplifier—refers to a current to voltage converter, most often implemented using an operational amplifier.

Piezoelectric sensor—refers to a sensor that relies on the piezoelectric effect, i.e., the electromechanical interaction between the mechanical and the electrical state in a certain class of materials.

Open-circuit voltage—refers to the difference of electrical potential between two terminals of a device when disconnected from any circuit.

Short-circuit charge—refers to charge moved between electrodes of a sensor when the voltage across the sensor is zero.

Short-circuit current—refers to the current moved between electrodes of a sensor when the voltage across the sensor is zero.

Wave number—refers to the spatial frequency of a wave, either in cycles per unit distance or radians per unit distance.

Sensing surface—refers to the surface of a sensor upon which an external force acts.

Sensing cell (or sensing unit)—refers to the portion of a sensor that includes the sufficient components to act as a standalone sensor. For example, a sensor that is a single electrode pair sensor may include a single pair of electrodes (such as a top electrode and a bottom electrode). Alternatively, a sensor that is a differential sensor may include three electrodes (such as a top electrode and two bottom electrodes). A sensing cell is a component that may serve as a standalone sensor or alternatively may be electrically connected in parallel to other sensing cells to form a larger sensor element.

FIG. 1: Embodiments of a Solid State Shear Sensor

Figure 1B:
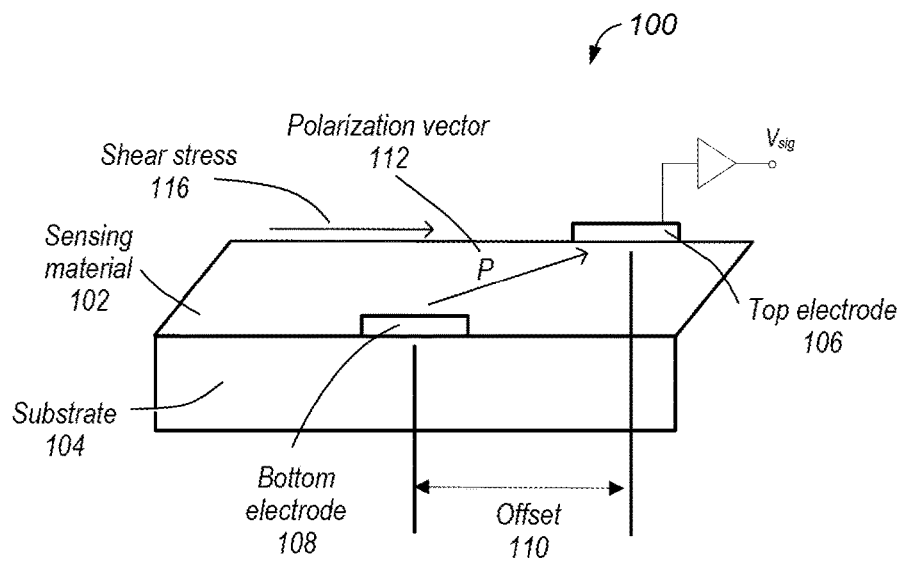

Turning now to FIGS. 1A and 1B, an example of a solid-state sensor is depicted according to some embodiments. As shown, solid-state sensor 100 may be a single electrode pair sensing cell (e.g., a sensor with a single pair of electrodes, such as a top electrode and a bottom electrode). FIG. 1A depicts an undeformed sensor (e.g., a sensor that is not experiencing an external force acting upon the sensor). The sensor may include sensing material 102 and substrate 104. Sensing material 102 may include a material that is electrostrictive (e.g., a material that changes shape in response to the application of an electric field), ferroelectric (e.g., a material that has the ability to store a permanent electrical polarization), and/or piezoelectric (e.g., a material that generates an electrical charge in response to the application of mechanical stimuli), or any material that can produce an electric potential (e.g., a voltage) when strained. Note that at least some of the above characteristics of the sensing material are not mutually exclusive. For example, all ferroelectric materials can exhibit piezoelectricity, while not all piezoelectric materials are ferroelectric. Substrate 104 may be made (or manufactured) from an appropriate material, including, for example, silicon, quartz, sapphire, or any other substrate known to those skilled in the art of semiconductor manufacture.

In some embodiments, top electrode 106 and bottom electrode 108 may be disposed adjacent to one or more surfaces of sensing material 102, e.g., top electrode 106 may disposed in a first plane and bottom electrode 108 may be disposed in a second plane. In some embodiments, the first and second planes may be approximately (or substantially) parallel and may define a first direction that is substantially parallel to a first surface of substrate 104. The first direction may be considered (substantially) horizontal in some embodiments, however, other orientations are contemplated, e.g., the first direction may be considered (substantially) vertical. Top electrode 106 and bottom electrode 108 may alternatively run through sensing material 102. For example, in FIG. 1A, top electrode 106 is disposed adjacent to the sensing surface 114 of sensing material 102 and bottom electrode 108 runs through sensing material 102. Any combination of configurations is contemplated by the current disclosure. Furthermore, top electrode and bottom electrode may be offset by a determined distance in a second direction (substantially) orthogonal to the first surface of substrate 104 (e.g., offset 110 may be offset by 4 µm, 8 µm, 12 µm, 16 µm, 20 µm, or any other appropriate distance). In some embodiments, the second direction may be considered substantially vertical if the first direction is considered substantially horizontal, however, other orientations are contemplated, e.g., the first direction may be considered (substantially) vertical and the second direction may be considered (substantially) horizontal.

In some applications, an electrical polarization may be induced in sensing material 102, for example by imposing an external bias (e.g., a 5V DC bias). The induced electrical polarization may be represented by a polarization vector, such as polarization vector 112. Polarization vector 112 may be oriented between top electrode 106 and bottom electrode 108 and may be at an angle relative to sensing surface 114 of sensor 100 (e.g., polarization vector 112 may be orientated at 15, 30, 45, or 60 degrees relative to sensing surface 114, among other orientations). Note that some materials, such as ferroelectric materials, may maintain the electrical polarization even after removal of the bias if the material undergoes a poling procedure at certain temperatures (e.g., a temperature elevated at or above room temperature). In other words, for these materials, the presence of a bias during operation may be optional. With other materials, such as electrostrictive materials, a non-zero bias may be required during operation.

Sensor 100 may experience a force that may cause sensing material 102 to deform. Sensing material 102 may deform in the direction of the applied force due to shear stress and/or normal stress resulting from the applied force. Note that the force may result only in shear stress (e.g., the force may be applied parallel, or approximately parallel, to sensing surface 114), only in normal stress (e.g., the force may be applied orthogonal, or approximately orthogonal, to sensing surface 114), or in both normal and shear stress (e.g., the force may be a vector with both parallel and orthogonal components relative to sensing surface 114). When sensing element 102 deforms, polarization vector 112 may elongate in response to the deformation. The elongation of polarization vector 112 may produce an additional electrical potential signal, $V_{sig}$. The magnitude of $V_{sig}$ may be proportional to applied shear stress 116 at sensing surface 114. The electrical potential signal may be measured in order to discern (or determine; e.g., measure) the magnitude of shear stress 116. For example, $V_{sig}$ may be measured using a standard charge amplifier or a high input impedance voltage amplifier, among other measuring devices.

Notably, sensor 100 may produce an electrical response to both shear stress and to normal stress. Under both shear and normal stress, polarization vector 112 may extend and/or contract, creating an electrical potential that may be measured (or determined) according to the means discussed above.

Methods of Manufacture

As discussed above, a sensor may include a sensing material, a substrate, and a number of electrodes (e.g., sensor 100 may include at least two electrodes, such as top electrode 106 and bottom electrode 108). According to some embodiments, a sensor may be manufactured (or created) using a number of manufacturing techniques, including, for example, a microfabrication procedure (e.g., a fabrication technique common in the field of microelectromechanical systems (MEMS)). As discussed above, a sensor may include a substrate (e.g., substrate 104 of sensor 100), wherein the substrate is made out of an appropriate material (e.g., silicon, sapphire, quartz, silicon-on-insulator wafers, or any other substrate common in the field of MEMS and/or semiconductor manufacture).

Any of the electrodes included in the sensor may be realized (or situated) by depositing and etching layers of material (e.g., metal layers such as aluminum, titanium, platinum, or any other suitable material) in a manner known to those skilled in the art. In some embodiments, the electrodes may include one or more layers of materials (e.g., an electrode may include titanium and platinum, wherein the titanium provides an adhesion layer for the platinum). In some embodiments, as an alternative to depositing and etching layers of material to realize the electrodes, the electrodes may be realized (or patterned) by means of a lift-off procedure in a manner known to those skilled in the art.

According to some embodiments, the sensing material of a sensor may be made (or manufactured) from any suitable material, including, for example, a ferroelectric material (e.g., lead zirconate titanate (PZT)), a piezoelectric material (e.g., a piezoelectric crystal such as, for example, aluminum nitride (AlN) or zinc oxide (ZnO)), an electrostrictive material, or any material that can produce an electric potential (e.g., a voltage) when strained. According to some embodiments, the sensing material may be deposited, situated, or grown using standard MEMS processing techniques known to those skilled in the art. For example, the sensing material may be PZT and the PZT may be spun onto a wafer using a sol-gel process known to those skilled in the art.

Note that a number of sensors and/or sensing cells according to one or various embodiments discussed above may be fabricated (or manufactured) in parallel. Sensing cells sensitive to shear stress and sensing cell sensitive to normal stress may be fabricated in parallel and may reside (or be disposed) on the same die together (e.g., in close proximity).

According to some embodiments, any number of sensors (e.g., a single sensor or more than one sensor) may be fabricated on a single die. The die may be mounted (or reside) on the head of a shaft. The shaft may be mounted on a panel or in a wall such that the sensor or sensors on the die are approximately (or substantially) flush with the panel or the wall. According to some embodiments, the shaft and the panel or the wall may be threaded, such that the shaft may be advanced into the panel or the wall. The signal or signals from the sensor or sensors mounted on the shaft may be determined (or measured) using readout electronics. The readout electronics may be positioned away from the sensing surface (e.g., away from the sensing cells). The signal or signals from the sensor or sensors may be connected to the readout electronics using a cable (e.g., a flexible cable) or by any other appropriate means.

Measuring the Output of a Sensing Cell

According to some embodiments the signal (or the output) of a sensing cell may be input into an amplifier. For example, the amplifier may be a high input impedance configuration, in which case the voltage of the signal is the measurand, or the amplifier may be a low input impedance amplifier (e.g., the low input impedance amplifier may be a charge amplifier or a transimpedance amplifier), in which case the charge (or the current) is the measurand.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer program, if executed by a computer system, may cause the computer system to perform a method, e.g., any of a method embodiments described herein, or, any combination of the method embodiments described herein, or, any subset of any of the method embodiments described herein, or, any combination of such subsets.

In some embodiments, a device may be configured to include a processor (or a set of processors) and a memory medium, where the memory medium stores program instructions or a computer program, where the processor is configured to read and execute the program instructions or computer program from the memory medium, where the program instructions are, or computer program is, executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A sensor system, comprising:
   a substrate;
   a first layer of piezoelectric sensing material disposed on a first surface of the substrate; and
   at least two electrodes forming an electrode pair, wherein the at least two electrodes comprise a first electrode disposed on a surface of the piezoelectric sensing material and a second electrode disposed on the first surface of the substrate, wherein the first electrode is disposed in a first plane, wherein the second electrode is disposed in a second plane, wherein the first and second planes are substantially parallel to one another, thereby defining a first direction substantially parallel to the first surface, and wherein the first and second electrodes are at least partially offset in the first direction; and
   wherein the sensor system is configured to generate an output signal in response to a shear stress within the piezoelectric sensing material, and wherein, responsive to the shear stress, the piezoelectric sensing material is configured to deform in-plane relative to the substrate such that the first and second planes remain substantially parallel.

2. The sensor system of claim 1, wherein the output signal is useable to sense force or stress responsive to a force applied to the sensor system.

3. The sensor system of claim 1, wherein the output signal is useable to sense a shear force or a shear stress responsive to a force applied to the sensor system.

4. The sensor system of claim 1, wherein the shear stress is responsive to a force applied to the sensor system, wherein the force applied is a force vector comprising a first force component orthogonal to the sensor system and a second force component parallel to the sensor system.

5. The sensor system of claim 4, wherein the output signal is responsive to the second force component.

6. The sensor system of claim 1, wherein a direct current (DC) bias voltage is applied between or across the at least two electrodes during operation.

7. The sensor system of claim 1, wherein a polarization is induced between or across the at least two electrodes, wherein the polarization induces a first polarization vector, wherein a direction of the first polarization vector points substantially between the at least two electrodes.

8. The sensor system of claim 1, wherein a polarization is induced between or across the at least two electrodes, wherein the polarization induces a first polarization vector, wherein the first polarization vector has a direction substantially parallel to a plane defined by the at least two electrodes.

9. The sensor system of claim 1, wherein the first layer of piezoelectric sensing material is a ferroelectric material.

10. The sensor system of claim 1, wherein the second electrode is disposed within the first layer of piezoelectric sensing material.

11. The sensor system of claim 1, wherein the substrate is one of silicon or sapphire.

12. The sensor system of claim 1, wherein, responsive to the shear stress, the piezoelectric sensing material is configured to deform in-plane relative to the substrate such that the first and second planes remain substantially parallel.

13. A system comprising:
a layer of piezoelectric sensing material disposed on a substrate; and
at least two electrodes forming an electrode pair, wherein a first electrode of the at least two electrodes is disposed in a first plane, wherein a second electrode of the at least two electrodes is disposed in a second plane, wherein the first and second planes are parallel to one another; and
wherein the system is configured to generate an output signal in response to a shear stress within the piezoelectric sensing material, and wherein, responsive to the shear stress, the piezoelectric sensing material is configured to deform in-plane relative to the substrate such that the first and second planes remain substantially parallel.

14. The system of claim 13, wherein the first plane comprises a surface of the piezoelectric sensing material, wherein the second plane comprises a surface of the substrate.

15. The system claim 13, wherein a direct current (DC) bias voltage is applied between the at least two electrodes during operation.

16. The system of claim 13, wherein a polarization is induced to define a first polarization vector, wherein a direction of the first polarization vector points substantially between the at least two electrodes.

17. The system of claim 16, wherein the direction of the first polarization vector is substantially parallel to a plane defined by the at least two electrodes.

18. The system of claim 16, wherein, responsive to the shear stress, a magnitude of the first polarization vector changes in proportion to a magnitude of the shear stress.

19. The system of claim 13, wherein the piezoelectric sensing material is a ferroelectric material.

20. The system of claim 13, wherein the shear stress is responsive to a force applied to the system, wherein the force applied is a force vector comprising a first force component orthogonal to the system and a second force component parallel to the system; and
wherein the output signal is responsive to the second force component.

* * * * *